(12) United States Patent
Zhang

(10) Patent No.: US 11,729,460 B2
(45) Date of Patent: Aug. 15, 2023

(54) ELECTRONIC DEVICE AND PROCESSING METHOD AND SYSTEM

(71) Applicant: Lenovo (Beijing) Limited, Beijing (CN)

(72) Inventor: Ya Zhang, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 43 days.

(21) Appl. No.: 17/551,727

(22) Filed: Dec. 15, 2021

(65) Prior Publication Data

US 2022/0321950 A1 Oct. 6, 2022

(30) Foreign Application Priority Data

Mar. 31, 2021 (CN) .................. 202110347671.5

(51) Int. Cl.
*H04N 21/4402* (2011.01)
*G06F 3/14* (2006.01)
*H04N 5/46* (2006.01)
*H04N 21/63* (2011.01)

(52) U.S. Cl.
CPC ....... *H04N 21/4402* (2013.01); *G06F 3/1415* (2013.01); *H04N 5/46* (2013.01); *H04N 21/631* (2013.01)

(58) Field of Classification Search
CPC .... H04N 21/4402; H04N 5/46; H04N 21/631; G06F 3/1415
See application file for complete search history.

(56) References Cited

U.S. PATENT DOCUMENTS

2015/0023648 A1* 1/2015 Sheth ............... H04N 21/25825
386/230
2018/0184171 A1* 6/2018 Danker ................ H04N 5/272

FOREIGN PATENT DOCUMENTS

| CN | 101646046 A | 2/2010 |
| CN | 103686398 A | 3/2014 |
| CN | 107257338 A | 10/2017 |
| CN | 111866572 A | 10/2020 |
| TW | M592840 U | 5/2021 |

* cited by examiner

*Primary Examiner* — Sunghyoun Park
(74) *Attorney, Agent, or Firm* — Anova Law Group, PLLC

(57) ABSTRACT

An electronic device includes a first interface configured to obtain a first media data of a first source device; a second interface configured to obtain a second media data of a second source device; a processing device configured to generate a third media data; and an output device configured to output media data. The media data may be the first media data, the second media data, or the third media data. The third media data affects the first media data or the second media data if the third media data and the first media data are simultaneously outputted, or the third media data and the second media data are simultaneously outputted. The processing device is configured to process the first media data and the second media data to obtain a processing result, the processing result being used to generate presentation data indicating correspondences between interfaces and the media data.

20 Claims, 4 Drawing Sheets

S71 The processing device obtains the first media data, the first media data being data obtained from a first interface connected to a first source device S72 The processing device obtains the second media data, the second media data being data obtained from a second interface connected to a second source device S73 The processing device processes the first media data and the second media data to obtain a processing result, the processing result being used to generate the presentation data indicating a correspondence between the interface and the media data, where the processing device generates the third media data, and the third media data affects the first media data or the second media data if the output device simultaneously outputs the third media data and the first media data, or, if the output device simultaneously outputs the third media data and the second media data

FIG. 7

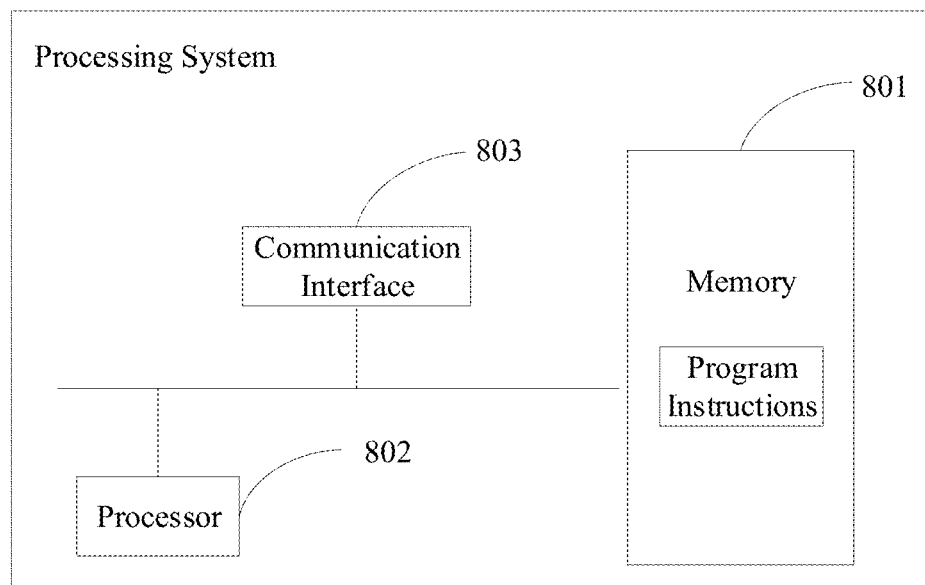

FIG. 8

ELECTRONIC DEVICE AND PROCESSING METHOD AND SYSTEM

CROSS-REFERENCES TO RELATED APPLICATION

This application claims priority to Chinese Patent Application No. 202110347671.5, filed on Mar. 31, 2021, the entire content of which is incorporated herein by reference.

FIELD OF TECHNOLOGY

The present disclosure relates to the fields of control and, more specifically, to an electronic device, a processing method, and a processing system.

BACKGROUND

Multiple video interfaces are often arranged on a display device, and each video interface corresponds to a different source device. The media data of different source devices can be obtained through different video interfaces.

Generally, the display device can only display the media data obtained through a video interface, which requires the user to select the corresponding interface such that the display device can display the media data corresponding to the interface. However, the names of the video interfaces, such as HDMI, DP, VGA, etc., can be difficult for an ordinary user to understand and select.

BRIEF SUMMARY OF THE DISCLOSURE

One aspect of the present disclosure provides an electronic device. The electronic device includes a first interface configured to obtain a first media data of a connected first source device; a second interface configured to obtain a second media data of a connected second source device; a processing device configured to generate a third media data; and an output device configured to output media data. The media data is the first media data, the second media data, or the third media data. The third media data affects the first media data or the second media data if the third media data and the first media data are simultaneously outputted, or the third media data and the second media data are simultaneously outputted. The processing device is further configured to obtain and process the first media data and the second media data to obtain a processing result, the processing result being used to generate presentation data indicating correspondences between the interfaces and the media data.

Another aspect of the present disclosure provides a processing method. The processing method includes obtaining, by a processing device, a first media data, the first media data being data obtained from a first interface connected to a first source device; obtaining, by the processing device, a second media data, the second media data being data obtained from a second interface connected to a second source device; processing, by the processing device, the first media data and the second media data to obtain a processing result, the processing result being used to generate presentation data indicating a correspondence between the interface and the media data. The processing device is configured to generate a third media data. The third media data affects the first media data or the second media data if the third media data and the first media data are simultaneously outputted, or the third media data and the second media data are simultaneously outputted.

Another aspect of the present disclosure provides a processing system. The processing system includes a processor and a memory storing program instructions that, when being executed by the processor, cause the processor to obtain a first media data of a connected first source device through a first interface; obtain a second media data of a connected second source device through a second interface; generate a third media data; and output media data, the media data being the first media data, the second media data, or the third media data, the third media data affecting the first media data or the second media data if the third media data and the first media data are simultaneously outputted, or the third media data and the second media data are simultaneously outputted.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

FIG. 7 is a flowchart of a processing method according to an embodiment of the present disclosure.

FIG. 8 is a schematic structural diagram of a processing system according to an embodiment of the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
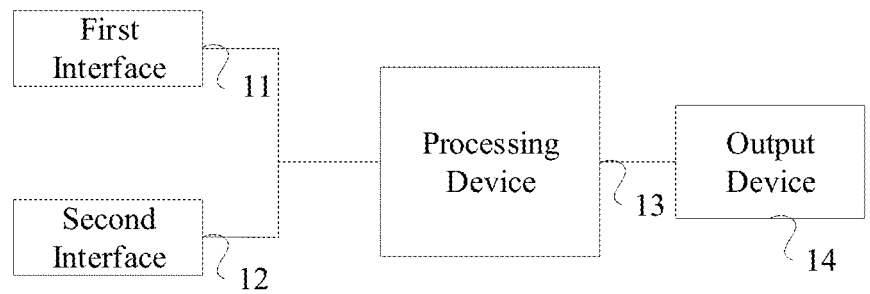
FIG. 1 is a schematic structural diagram of an electronic device according to an embodiment of the present disclosure.

An embodiment of the present disclosure provides an electronic device. The schematic diagram of the electronic device is shown in FIG. 1. As shown in FIG. 1, the electronic device includes a first interface 11, a second interface 12, a processing device 13, and an output device 14. In some embodiments, the first interface 11 may be configured to obtain a first media of a connected first source device, the second interface 12 may be configured to obtain a second media data of a connected second source device, the processing device 13 may be configured to generate a third media data, and the output device 14 may be configured to output media data. The media data may be the first media data, the second media data, or the third media data. In some embodiments, if the third media data and the first media data are output at the same time, or the third media data and the second media data are output at the same time, the third media data may affect the first media data or the second media data.

In some embodiments, the processing device 13 may be further configured to obtain and process the first media data and the second media data to obtain a processing result. The processing device may be used to generate presentation data of the correspondence between an interface instruction and the media data.

The electronic device may be a display device, such as a display, or other devices with a display. The first source device and the second source device may be devices such as a host or a mobile phone.

The electronic device may include a first interface and a second interface, and may be configured to obtain media data of other devices through the first interface and the second interface. At the same time, the electronic device may also include a processing device that can generate media data.

When the output device of the electronic device outputs media data, if the media data generated by the processing device is being output at the same time as the media data of other devices, then the output of the third media data generated by the output device by the output device may affect the obtained first media data and/or the second media data.

Taking the simultaneous output of the first media data and the third media data as an example, if the first media data and the third media data are output on the output device at the same time, the third media data may block the first media data. The third media data may block part of or all of the first media data, such that the third media data can be completely visible, but the first media data may be completely invisible or partially invisible. That is, the third media data may be displayed on the uppermost layer of the output device, and all or part of the first media data may be output as the background of the third media data. The third media data may be controlled first, and the first media data may be controlled only when the output of the third media data is turned off.

Figure 2:
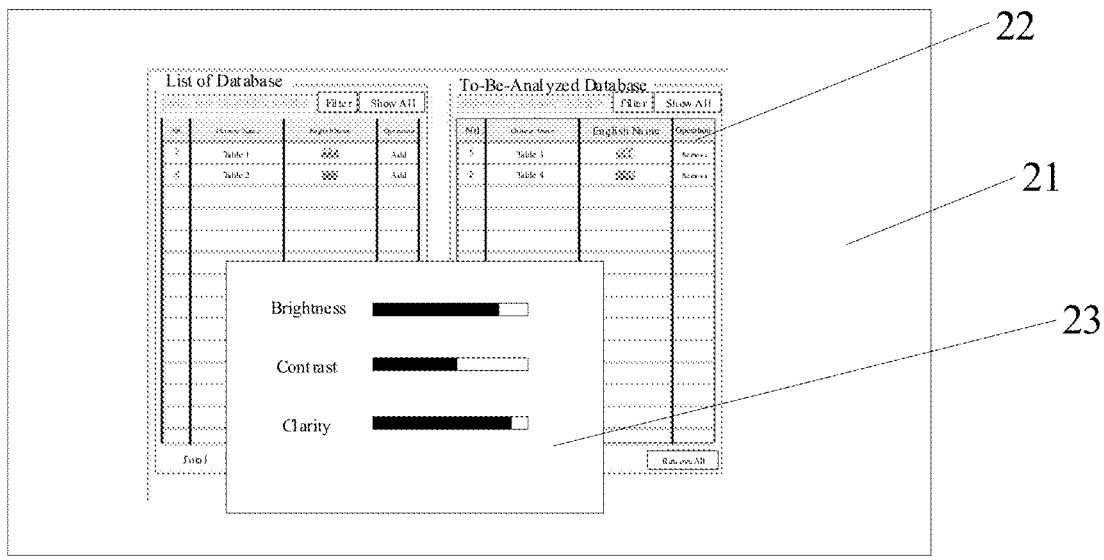
FIG. 2 is a schematic diagram of a third media data affecting a first media data according to an embodiment of the present disclosure.

As shown in FIG. 2, which includes an output device 21, a first media data 22, and a third media data 23. In some embodiments, when the third media data 23 and the first media data 22 are output at the same time, the third media data 23 may block the first media data 22.

Similarly, if the second media data and the third media data are output at the same time, the third media data may also block all of part of the second media data.

Alternatively, if the third media data and the first media data are output at the same time, or the third media data and the second media data are output at the same time, the third media data affecting the output of the first media data and/or the second media data may be that when the processing device determines that there is a need to output the third media data and the first media data at the same time, or to output the third media data and the second media data at the same time, the output device may be controlled to output the third media data without outputting the first media data or the second media data. Or, after the output device finishes outputting the third media data, the first media data or the second media data may be called to output the first media data or the second media data through the output device.

In some embodiments, the third media data maybe the content of the on-screen display (OSD) interface generated by the electronic device itself or the locally read content. The first media data may be a video signal of an external device received by the electronic device, instead of the video signal generated by the electronic device itself. The second media data may be a video signal of the external device received by the electronic device, instead of the video signal generated by the electronic device itself The processing device may process the first media data and the second media data after obtaining the first media data and the second media data, thereby generating the presentation data for indicating the correspondence between the interface and the media data.

The presentation data may indicate the correspondence between different interfaces and media data. For example, the presentation data may indicate that the media data of the first source device connected to the electronic device through the first interface is the first media data, and may indicate that the content of the first media data through the presentation data. Similarly, the presentation data may also indicate that the media data of the second source device connected to the electronic device through the second interface is the second media data, and may indicate that the content of the second media data through the presentation data.

The third media data may be generated by the processing device of the electronic device. Therefore, after the third media data is generated, there may be no need to generate the presentation data for the third media data. Only when the media data of an external source device is obtained, the presentation data may be needed to determine which interface of the currently obtained media data is obtained through. Or, the presentation data may be needed to determine what media data is output by the source device connected to each interface.

When the user needs to select the interface connected to the electronic device, the media data corresponding to the source device connected to multiple interfaces may be directly viewed based on the presentation data, thereby realizing the selection of the interface based on the selection of the media data, and avoiding the inconvenience in operation when the user who does not have interface-related knowledge needs to select an interface.

The electronic device provided in the embodiments of the present disclosure may include a first interface that can be used to obtain the first media data of a connected first source device, a second interface that can be used to obtain the second media data of a connected second source device, a processing that can be used to generate the third media data, and the output device that can be used to output the media data. The media data may be the first media data, the second media data, or the third media data. If the third media data and the first media data are output at the same time, or the third media data and the second media data are output at the same time, the third media data may affect the first media data or the second media data. In some embodiments, the processing device can also be used to obtain and process the first media data and the second media data to obtain a processing result. The processing result may be used to generate the presentation data of the correspondence between the interface instruction and the media data. The electronic device provided in this technical solution can not only obtain the media data from different source devices through two different interfaces, but also generate the media data independently, and can be used to generate the presentation data of the correspondence between the interface and the media data when the electronic device obtains the media data sent by the external device, thereby achieving a clear representation of the correspondence between the interface and the media data through the presentation data. In this way, users can directly determine the media data corresponding to different interfaces based on the presentation data, thereby selecting the corresponding interface, such that the current device can display the media data corresponding to the instruction interface, and avoiding inconvenience in operation when users who do not have interface-related knowledge need to select the interface, which improves the user experience.

An embodiment of the present disclosure provides an electronic device. A structural schematic diagram of the electronic device is shown in FIG. 1, which includes a first interface 11, a second interface 12, a processing device 13, and an output device 14.

Other than the same structure as the previous embodiment, the processing device in the electronic device in this embodiment may be configured to obtain and process the first media data and the second media data to obtain the processing result. More specifically, the processing device may be configured to process the first media data obtained through the first interface to obtain the corresponding first identification data, and process the second media data obtained through the second interface to obtain the corresponding second identification data. The processing device may combine the first identification data and the second identification data with a preset user interface for device connections to generate the presentation data. In some embodiments, the presentation data may belong to the third media data.

After the processing device obtains the first media data through the first interface, the processing may process the first media data to obtain the first identification data. The first identification data may be used to characterize the first media data, and the user may determine the content of the first media data through the first identification data.

Specifically, the first identification data may be an image, text, or audio clip, etc. If the first identification data is an image, it may be a screenshot of the first media data. If the first identification data is text, it may be the content expressed by the first media data. For example, if the first media data is a desktop, the first identification data may be the interface of the desktop. If the first media data is a video clip, the first identification data may be the name of the film in which the video clip is cut from, or the content involved in the video clip, etc. If the first identification data is an audio clip, it may be the audio clip related to the first media data. For example, if the first media data is a video clip, the first identification data may be the audio data in the video clip, etc.

Similarly, after the processing device obtains the second media data through the second interface, the processing may process the second media data to obtain the second identification data. The second identification data may be used to characterize the second media data, and the user may determine the content of the first media data through the first identification data Similarly, the second identification data may also be an image, text, audio clip, etc.

In addition, the first identification data may also be a video or animation formed by continuous images, and the second identification data may also be a video or animation formed by continuous images.

In some embodiments, the processing device may be further configured to combine the first identification data and the second identification data with a preset user interface for device connections to generate the presentation data. In some embodiments, the presentation data may belong to the third media data.

Since the third media data is generated by the processing device, the processing device may directly generate the presentation data. That is, when the first interface and the second interface of the electronic device have source devices to transmit media data, the processing device may directly generate the presentation data and display it on the output device. In this process, the first media data and the second media data may not be displayed on the output device, but only the third media data, that is, the media data, may be displayed. In this way, the identifier of the first media data, the identifier of the second media data, and the correspondence between the identifiers and the interfaces may be directly output through the third media data without the need to repeatedly output the first media data and the second media data.

In some embodiments, a preset user interface for device connections may be pre-stored. That is, as long as a source device is connected to the electronic device through the interface, the media data of the source device may be directly displayed on the user interface for device connections to generate the presentation data.

More specifically, the preset user interface for device connections may include at least the identifiers of the interfaces included in the electronic device, such as the identifiers of the first interface and the second interface. In addition, a first corresponding position may be vacated at the position corresponding to the identifier of the first interface on the user interface for device connections to obtain the first media data of the first source device connected to the first interface, and add the first identification data of the first media data to the first corresponding position. Similarly, a second corresponding position may be vacated at a position corresponding to the identifier of the second interface on the user interface for device connections to obtain the second media data of the second source device connected to the second interface. The second identification data of the second media data may be added to the second corresponding positioning, thereby generating the presentation data.

Figure 3:
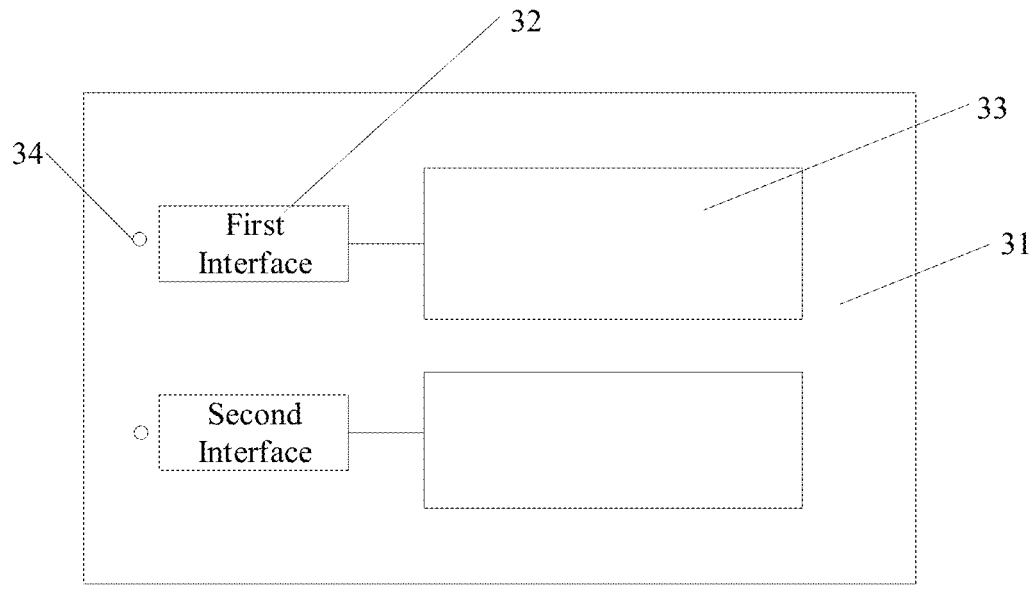
FIG. 3 is a schematic diagram of a preset user interface for device connections according to an embodiment of the present disclosure.

FIG. 3 is a schematic diagram of a preset user interface for device connections, which includes an user interface for device connections 31, an interface identifier 32, which can be used to add the corresponding positions 33 of the first identification data and the second identification data.

In addition, the user interface for device connections may also include a selection identifier 34. That is, after the first identification data and the second identification data are added to the corresponding positions, the presentation data can be formed. The user may select a corresponding interface based on the presentation data, and the selection identifier may be used to represent the user's selection of the interface.

Figure 4:
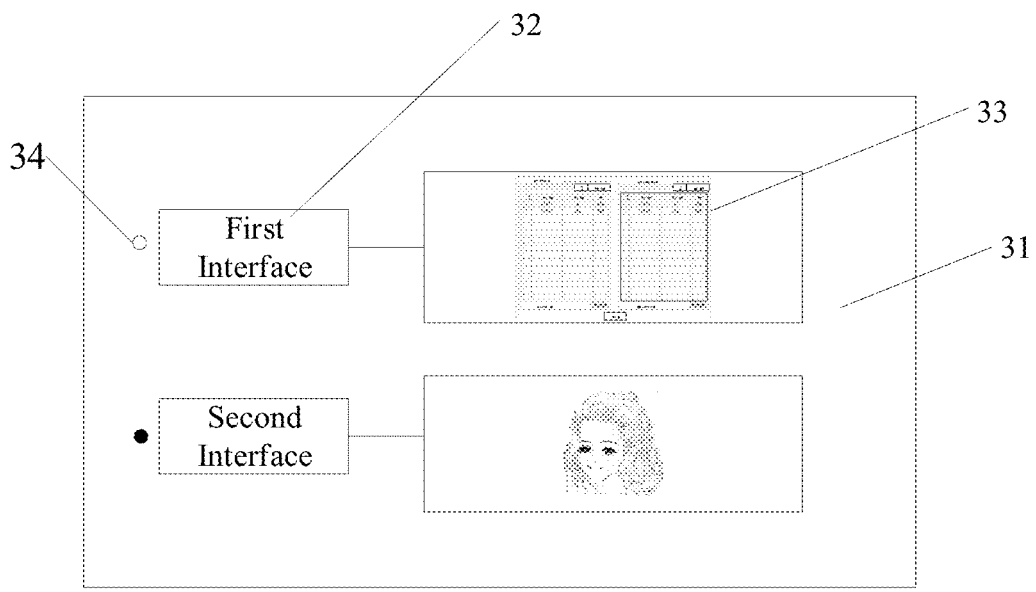
FIG. 4 is a schematic diagram of presentation data according to an embodiment of the present disclosure.

Take the first identification data and the second identification data as the screenshots of the first media data and the second media data as an example. As shown in FIG. 4, after adding the first identification data and the second identification data to the corresponding positions, the presentation data is formed. After the output device outputs the /,3 the media data of the source devices connected to different interfaces may be clearly indicated based on the presentation data, such that the user can determine the interface that needs to be selected currently based on the identification data in the presentation data.

FIG. 4 includes the user interface for device connections 31, the interface identifier 32, which can be used to add the corresponding positions 33 of the first identification data and the second identification data, and the selection identifier 34. In some embodiments, based on the selection identifier, the selected state of the second interface may be determined, then it can be determined that the user wants to obtain the second media data of the second source device connected to the second interface.

The electronic device provided in the embodiments of the present disclosure may include a first interface that can be used to obtain the first media data of a connected first source device, a second interface that can be used to obtain the second media data of a connected second source device, a processing that can be used to generate the third media data, and the output device that can be used to output the media data. The media data may be the first media data, the second media data, or the third media data. If the third media data and the first media data are output at the same time, or the third media data and the second media data are output at the same time, the third media data may affect the first media data or the second media data. In some embodiments, the processing device can also be used to obtain and process the first media data and the second media data to obtain a processing result. The processing result may be used to generate the presentation data of the correspondence between the interface instruction and the media data. The electronic device provided in this technical solution can not only obtain the media data from different source devices through two different interfaces, but also generate the media data independently, and can be used to generate the presentation data of the correspondence between the interface and the media data when the electronic device obtains the media data sent by the external device, thereby achieving a clear representation of the correspondence between the interface and the media data through the presentation data. In this way, users can directly determine the media data corresponding to different interfaces based on the presentation data, thereby selecting the corresponding interface, such that the current device can display the media data corresponding to the instruction interface, and avoiding inconvenience in operation when users who do not have interface-related knowledge need to select the interface, which improves the user experience.

An embodiment of the present disclosure provides an electronic device. A structural schematic diagram of the electronic device is shown in FIG. 1, which includes a first interface 11, a second interface 12, a processing device 13, and an output device 14.

Other than the same structure as the previous embodiment, the processing device in this embodiment may be further configured to obtain and process the first media data and the second media data to obtain the processing result. More specifically, the processing device may be configured to process the first media data obtained through the first interface to obtain the corresponding first identification data, process the second media data obtained through the second interface to obtain the corresponding second identification data, and send the first identification data and the second identification data to the source device, such that the first source device or the second media data may form the presentation data.

After the processing device obtains the first media data and the second media data, the processing device may process the first media data and the second media data to obtain the first identification data and the second identification data. In addition, after obtaining the first identification data and the second identification data, the first identification data and the second identification data may be sent to the source device. In some embodiments, the source device may be a device requesting the formation of the presentation data. That is, the presentation data may be formed by the device requesting the formation of the presentation data itself, rather than the presentation data being formed by the processing device of the electronic device.

The presentation data may be generated and displayed on the first source device or the second source device, that is, the content of the soft OSD interface generated on the operating system. In some embodiments, the soft OSD may be the software or program running on the source device, and the content of the OSD interface may be controlled by the software or program running on the source device.

When the source device needs to obtain the presentation data, the source device needs to send a first acquisition instruction to the electronic device, and the electronic device can obtain the first acquisition instruction sent by the source device. The processing device may process the first media data and the second interface to obtain the first identification data and the second identification data. Subsequently, the processing device may sent the obtained first identification data and second identification data to the source device, and the source device may form the presentation data based on the first identification data and the second identification data, and output and display the presentation data.

In some embodiments, after the electronic device obtains the first acquisition instruction sent by the source device, based on the first acquisition instruction, the processing device may process the first media data and the second media data to obtain the first identification data and the second identification data. Alternatively, based on the first acquisition instruction, the processing device may send the pre-processed first identification data and second identification data to the source device. That is, the processing device may obtain and process the first media data and the second media data after obtaining the first acquisition instruction of the source device, thereby ensuring that the first identification data and the second identification data are real-time. Alternatively, the processing device may also obtain the first media data and the second media data in advance, and process the first media data and the second media data. In this way, after obtaining the first acquisition instruction sent by the source device, the first identification data and the second identification data obtained in advance can be directly sent to the source device, thereby improving the efficiency of data transmission.

In addition, after obtaining the first identification data and the second identification data sent by the electronic device, the source device may also add the first identification data and the second identification data to a preset user interface for device connections, and combine them to generate the presentation data. Of course, the source device may also adopt other methods to generate the presentation data, which is not limited in the embodiments of the present disclosure.

The source device may be a first source device connected to the electronic device through the first interface, or a second source device connected to the electronic device through the second interface. Alternatively, the source device may request identification data for both the first source device connected to the electronic device through the first interface and the second source device connected to the electronic device through the second interface to generate the presentation data.

In some embodiments, the electronic device may also include a third interface and a fourth interface.

In some embodiments, the third interface may be configured to transmit data with the first source device, and the fourth interface may be configured to transmit data with the second source device.

Figure 5:
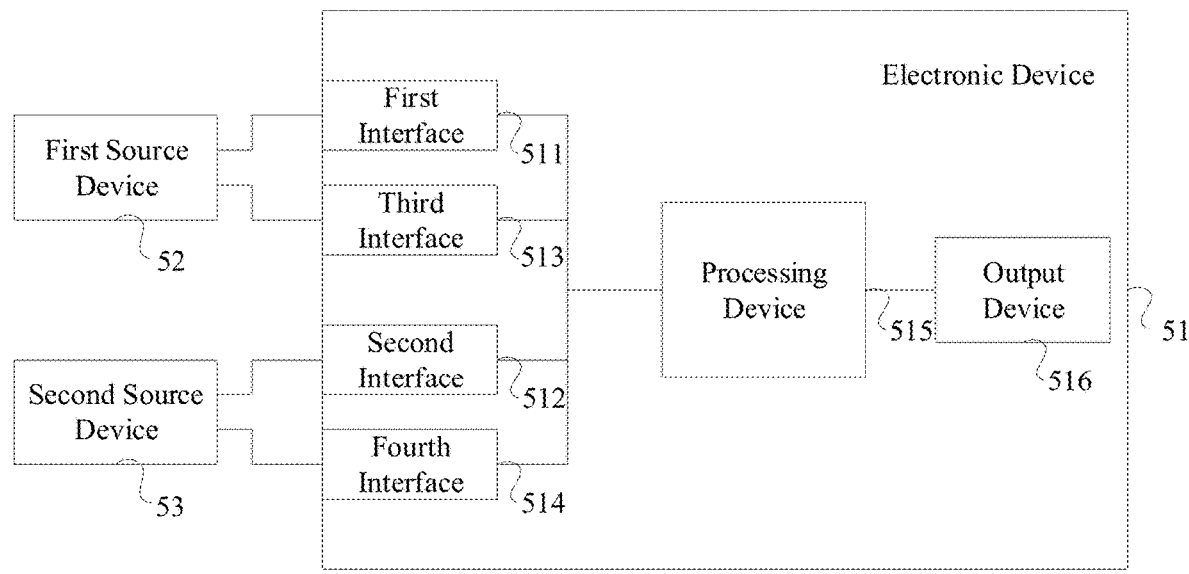
FIG. 5 is a schematic structural diagram of a data transmission system according to an embodiment of the present disclosure.

FIG. 5 is a schematic structural diagram of a data transmission system according to an embodiment of the present disclosure. The data transmission system includes an electronic device 51, a first source device 52, and a second source device 53. The electronic device includes a first interface 511, a second interface 512, a third interface 513, a fourth interface 514, a processing device 515, and an output device 516.

The first interface and the second interface may be the video ports connected between the processing device of the electronic device and the source device. That is, the media data may be obtained through the video port transmission, such as the DDC/CI channel in the video port between the main controller of the display and the host computer. The first interface and the second interface may be one of HDMI, DisplayPort, USB-C, VGA, etc.

DDC/CI is the display data channel command interface, which can be used to transmit the media data or instructions of the source device to the electronic device through the DDC/CI communication protocol of the first interface or the second interface. The first interface and the second interface may transmit data through the DDC/CI communication protocol.

The third interface and the fourth interface may be USB connection ports between the processing device of the electronic device and the source device, such as the USB connection channel between the display main controller and the host computer.

The processing device may respond to the first acquisition instruction from the first source device or the second source device, send the first identification data and the second identification data to the source device through the first interface or the third interface, or send the first identification data and the second identification data to the second source device through the second interface.

After the processing device obtains the first acquisition instruction sent by the first source device and requests to obtain the first identification data and the second identification data, the processing device may send the first identification data and the second identification data to the first source device through the first interface. That is, the identification data may be sent to the source device through the video port connection between the processing device of the electronic device and the first source device. More specifically, the first identification data and the second identification data obtained by the main controller may be transmitted through the DDC/CI channel in the video port between the display main controller and a first host. Alternatively, the identification data may be sent to the first source device through the third interface. That is, the identification data may be transmitted through the USB connection port between the processing device of the electronic device and the first source device.

If the processing device obtains the first acquisition instruction sent by the second source device and requests to obtain the first identification data and the second identification data, the first identification data and the second identification data may be sent to the second source device through the second interface. That is, the identification data may be sent to the source device through the video port connection between the processing device of the electronic device and the second source device. More specifically, the first identification data and the second identification data obtained by the main controller may be transmitted through the DDC/CI channel in the video port between the display main controller and a second host. Alternatively, the identification data may be sent to the second source device through the fourth interface. That is, the identification data may be transmitted through the USB connection port between the processing device of the electronic device and the second source device. It should be noted that before the processing device of the electronic device obtains the first acquisition instruction or a second instruction sent by the source deice, the processing device of the electronic device may need to be turned on. After the processing device is turned on, the main process of the processing device may be performed. The main process may be used to control the electronic device to display the default display screen. At this time, the default display screen displayed by the electronic device may be determined based on the default settings of the electronic device. For example, the electronic device may default to display the screen obtained through the first interface, or the electronic device may default to display a preset screen. After the processing device obtains the first acquisition instruction or the second acquisition instruction sent by the source device, the electronic device may still display its default display screen until it is determined that the presentation data generated by the first source device or the second source device needs to be displayed.

The electronic device provided in the embodiments of the present disclosure may include a first interface that can be used to obtain the first media data of a connected first source device, a second interface that can be used to obtain the second media data of a connected second source device, a processing that can be used to generate the third media data, and the output device that can be used to output the media data. The media data may be the first media data, the second media data, or the third media data. If the third media data and the first media data are output at the same time, or the third media data and the second media data are output at the same time, the third media data may affect the first media data or the second media data. In some embodiments, the processing device can also be used to obtain and process the first media data and the second media data to obtain a processing result. The processing result may be used to generate the presentation data of the correspondence between the interface instruction and the media data. The electronic device provided in this technical solution can not only obtain the media data from different source devices through two different interfaces, but also generate the media data independently, and can be used to generate the presentation data of the correspondence between the interface and the media data when the electronic device obtains the media data sent by the external device, thereby achieving a clear representation of the correspondence between the interface and the media data through the presentation data. In this way, users can directly determine the media data corresponding to different interfaces based on the presentation data, thereby selecting the corresponding interface, such that the current device can display the media data corresponding to the instruction interface, and avoiding inconvenience in operation when users who do not have interface-related knowledge need to select the interface, which improves the user experience.

Figure 6:
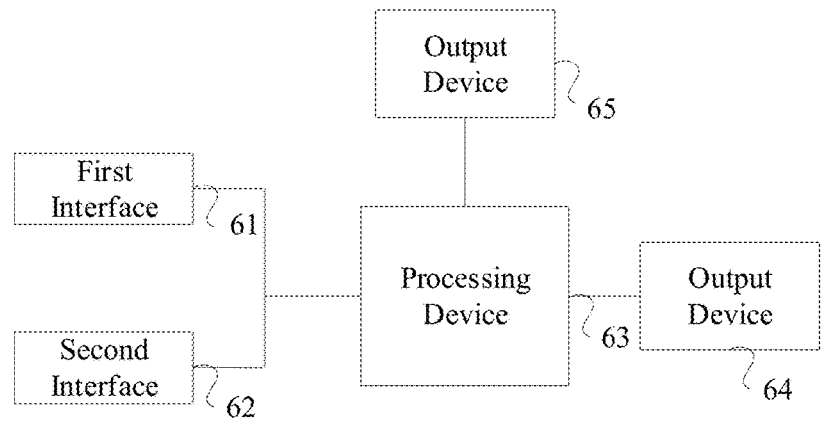
FIG. 6 is a schematic structural diagram of the electronic device according to an embodiment of the present disclosure.

FIG. 6 is a schematic structural diagram of the electronic device according to an embodiment of the present disclosure. As shown in FIG. 6, the electronic device includes a first interface 61, a second interface 62, a processing device 63, an output device 64, and a timer 65.

In addition to the same structure as the previous embodiment, this embodiment also adds a timer 65.

In some embodiments, the timer may be used to determine whether a preset period of time is reached, and when the preset period of time is reached, reset the timer and start timing again.

The processing may be further configured to process the first media data obtained through the first interface when the timer determines that the preset period of time is reached, and at the same time, process the second media data obtained through the second interface.

In addition, the electronic device provided in the embodiments of the present disclosure may also include a storage device. In some embodiments, the storage device may be used to store the first identification data and the second identification data.

A preset period of time may be set in advance, and only when the preset period of time is reached, the processing may obtain the first media data through the first interface, and at the same time, obtain the second media data through the second interface. When the preset period of time is not reached, the processing device may not obtain the first media data and the second media data, regardless of whether the presentation data generation instruction or the first acquisition instruction used to obtain the identification data is received.

The processing device may obtain the media data through the interface only when the timer determines that the preset period of time is cleared to zero. In this way, when the presentation data needs to be generated, the first media data and the second media data obtained in advance may be directly processed to obtain the presentation data. Alternatively, when the first acquisition instruction sent by the source device is obtained, the first media data and the second media data obtained in advance may be directly processed to obtain the first identification data and the second identification data, and the first identification data and the second identification data may be sent to the source device.

When the first media data and the second media data are obtained when the preset period of time is reached, a storage device may be needed to store the first media data and the second media data obtained in advance. In this way, when the presentation data needs to be generated or the first acquisition instruction is obtained, the first media data and the second media data obtained in advance may be directly retrieved from the storage device.

In addition, the storage device may also store the first identification data and the second identification data.

Further, the processing device may be further configured to, in response to obtaining the second acquisition instruction, determine that a difference between the time when the first media data and the second media data are obtained and the current time is less than the preset period of time, and using the stored first identification data and second identification data to generate the presentation data.

In some embodiments, the second acquisition instruction may be an instruction for obtaining the presentation data, or the first acquisition instruction for obtaining the first identification data and the second identification data.

If the processing device independently generates the presentation data, the storage device may need to store the preset user interface for device connections first, and process the first media data and the second media data stored in advance in the storage device to obtain the first identification data and the second identification data. The presentation data may be generated based on the first identification data, the second identification data, and the user interface for device connections.

After processing the first media data and the second media data to obtain the first identification data and the second identification data, the first identification data and the second identification data may also be stored. In this way, after the first media data and the second media data are obtained again and the preset period of time is reached next time, whether the newly obtained first media data is the same as the first media data obtained when the preset period of time is reach last time may be determined. If the two first media data are the same, then there may be no need to store the first media data obtained this time. When there is a need to generate the presentation data or when the first acquisition instruction is obtained, the first identification data may be directly retrieved from the storage device.

Similar, after the second media data is obtained again and the preset period of time is reached next time, whether the newly obtained second media data is the same as the second media data obtained when the preset period of time is reach last time may be determined. If the two first media data are the same, then there may be no need to store the second media data obtained this time. When there is a need to generate the presentation data or when the first acquisition instruction is obtained, the second identification data may be directly retrieved from the storage device.

If the newly obtained first media data or second media data is different, the first identification data or second identification data stored in the storage device corresponding to the first media data or the second media data obtained last time may need to be deleted. In this way, when there is a need to generate the presentation data or when the first acquisition instruction is obtained, the first identification data and the second identification data may be generated based on the newly obtained first media data and second media data.

In addition, if the output device outputs the first media data and the timer determines that the preset period of time is reached, the first media data may be processed to obtain the first identification data. At the same time, the second media data may be obtained from the second interface, and the second media data may be processed to obtain the second identification data.

The first interface of the electronic device may be connected to the first source device to obtain the first media data of the first source device. If the output device outputs the first media data, that is, the output device of the electronic device always obtains the first media data of the first source device through the first interface, at this time, the second interface may not be always turned on, and the electronic device may not obtain the second media data connected through the second interface in real time.

Therefore, when a preset period of time is reached, the second interface may be turned on to obtain and store the second media data of the second source device through the second interface. Alternatively, the second interface may be turned on at a set time to obtain the second media data of the second source device through the second interface. The second media data may be processed to obtain the second identification data, and the second identification data may be stored.

In this process, since the first interface is always turned on and the electronic device obtains the first media data of the first source device in real time, when the preset period of time is reached, there may be no need to obtain the first media data, but only to store the first media data, or the first media data may be processed to obtain the first identification data, and the first identification data may be stored.

It should be noted that before the processing device of the electronic device determines that the preset period of time is reached, the processing device of the electronic device may be tuned on. After the processing device is turned on, the main process of the processing device may be performed. The main process may be used to control the electronic device to display the default display screen. At this time, the default display screen displayed by the electronic device may be determined based on the default settings of the electronic device. For example, the electronic device may default to display the screen obtained through the first interface, or the electronic device may default to display a preset screen. After the processing device determines that the preset period of time is reached, the electronic device may still display the default display screen until it is determined that the presentation data needs to be displayed based on the second acquisition instruction.

The electronic device provided in the embodiments of the present disclosure may include a first interface that can be used to obtain the first media data of a connected first source device, a second interface that can be used to obtain the second media data of a connected second source device, a processing that can be used to generate the third media data, and the output device that can be used to output the media data. The media data may be the first media data, the second media data, or the third media data. If the third media data and the first media data are output at the same time, or the third media data and the second media data are output at the same time, the third media data may affect the first media data or the second media data. In some embodiments, the processing device can also be used to obtain and process the first media data and the second media data to obtain a processing result. The processing result may be used to generate the presentation data of the correspondence between the interface instruction and the media data. The electronic device provided in this technical solution can not only obtain the media data from different source devices through two different interfaces, but also generate the media data independently, and can be used to generate the presentation data of the correspondence between the interface and the media data when the electronic device obtains the media data sent by the external device, thereby achieving a clear representation of the correspondence between the interface and the media data through the presentation data. In this way, users can directly determine the media data corresponding to different interfaces based on the presentation data, thereby selecting the corresponding interface, such that the current device can display the media data corresponding to the instruction interface, and avoiding inconvenience in operation when users who do not have interface-related knowledge need to select the interface, which improves the user experience.

FIG. 7 is a flowchart of a processing method according to an embodiment of the present disclosure. The method will be described in detail below.

S71, the processing device obtains the first media data, the first media data being data obtained from a first interface connected to a first source device.

S72, processing device obtains the second media data, the second media data being data obtained from a second interface connected to a second source device S73, the processing device processes the first media data and the second media data to obtain a processing result, the processing result being used to generate the presentation data of the correspondence between the interface and the media data. In some embodiments, the processing device may generate the third media data. If the output device simultaneously outputs the third media data and the first media data, or, if the output device simultaneously outputs the third media data and the second media data, the third media data may affect the first media data or the second media data.

In some embodiments, the processing device processing the first media data and the second media data to obtain the processing result may include the processing device processing the first media data obtained through the first interface to obtain the corresponding first identification data, processing the second media data obtained through the second interface to obtain the corresponding second identification data, and combining the first identification data and the second identification data with a preset user interface for device connections to from the presentation data, the presentation data belonging to the third media data.

In some embodiments, the processing device processing the first media data and the second media data to obtain the processing result may include the processing device processing the first media data obtained through the first interface to obtain the corresponding first identification data, processing the second media data obtained through the second interface to obtain the corresponding second identification data, and sending the first identification data and the second identification data to the source device, such that the first source device or the second media data may form the presentation data.

Further, when responding to the first acquisition instruction from the first source device or the second source device, the processing device may send the first identification data and the second identification data to the first source device through the first interface or the third interface. In some embodiments, the third interface may be configured to transmit data with the first source device. The first identification data and the second identification data may be sent to the second source device through the second interface or the fourth interface. In some embodiments, the fourth interface may be configured to transmit data with the second source device.

In some embodiments, when the processing device determines through the timer that the preset period of time is reached, the processing device may process the first media data obtained through the first interface, and at the same time, process the second media data obtained through the second interface. In some embodiments, the timer may be configured to determine whether the preset period of time is reached, and when the preset period of time is reached, reset the timer and starting timing again.

In some embodiments, the processing device may be further configured to control the storage device to store the first identification data and the second identification data.

In some embodiments, if the output device outputs the first media data and the timer determines that the preset period of time is reached, the first media data may be processed to obtain the first identification data, and at the same time, the second media data may be obtained from the second interface, and the second media data may be processed to obtain the second identification data.

In some embodiments, in response to obtaining the second acquisition instruction, the processing device may be configured to determine that the difference between the time when the first media data and the second media data are obtained and the current time is less than the preset period of time, and use the stored first identification data and second identification data to generate the presentation data.

The processing method provided in the embodiments of the present disclosure can be applied to a processing device. The processing device may be part of the electronic device described in the foregoing embodiments, and the technical solutions provided in the present disclosure may be implemented based on the foregoing embodiments, which will not be repeated here.

Consistent with the present disclosure, the processing device can obtain the first media data, the first media data being data obtained from the first interface connected to the first source device. The processing device can also obtain the second media data, the second media data being data obtained from the second interface connected to the second source device. The processing device can process the first media data and the second media data to obtain a processing result, which can be used to generate the presentation data indicating the correspondence between the interface and the media data. In some embodiments, the processing device may generate the third media data. If the output device simultaneously outputs the third media data and the first media data, or, simultaneously outputs the third media data and the second media data, the third media data may affect the first media data or the second media data. The electronic device provided in this technical solution can not only obtain the media data from different source devices through two different interfaces, but also generate the media data independently, and can be used to generate the presentation data of the correspondence between the interface and the media data when the electronic device obtains the media data sent by the external device, thereby achieving a clear representation of the correspondence between the interface and the media data through the presentation data. In this way, users can directly determine the media data corresponding to different interfaces based on the presentation data, thereby selecting the corresponding interface, such that the current device can display the media data corresponding to the instruction interface, and avoiding inconvenience in operation when users who do not have interface-related knowledge need to select the interface, which improves the user experience.

FIG. 8 is a schematic structural diagram of a processing system according to an embodiment of the present disclosure. More specifically, the processing system includes a memory 801, a processor 802, and a communication interface 803.

The memory 801 may include a volatile memory. The memory 801 may also include a non-volatile memory. The memory 801 may further include a combination of the foregoing types of memories. The processor 802 may be a central processing unit (CPU). The processor 802 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), or any combination thereof. The communication interface 803 may be used to facilitate communication between the various parts in the processing system.

The memory 801 can be configured to store program instructions. The processor 802 can be configured to execute the program instructions stored in the memory 801. When executed by the processor 802, the program instructions can cause the processor 802 to implement the processing method described in the foregoing embodiments.

It should be noted that the various embodiments in the present specification are described in a progressive manner, and each embodiment focuses on differences from other embodiments, and the same similar parts between the various embodiments can be referred to each other. For the device provided in the embodiments, the corresponding description is relatively simple because the device corresponds to the method provided in the embodiments. The relevant portions may be referred to the description for the method parts.

The steps of the methods or algorithms described in conjunction with the embodiments of the present disclosure can be implemented with hardware, software modules executed by a processor, or a combination thereof. The software modules may reside in a random-access memory (RAM), an internal memory, a read-only memory (ROM), an electrically programmable ROM, an electrically-erasable programmable ROM, a register, a hard disk, a removable disk drive, CD-ROM, or other types of storage media well known in the technical field.

The above descriptions only illustrate some embodiments of the present disclosure. The present disclosure is not limited the described embodiments. A person having ordinary skill in the art may conceive various equivalent modifications or replacements based on the disclosed technology. Such modification or improvement also fall within the scope of the present disclosure. A true scope and spirit of the present disclosure are indicated by the following claims.

What is claimed is:

1. An electronic device comprising:
   a first interface configured to obtain a first media data of a connected first source device;
   a second interface configured to obtain a second media data of a connected second source device;
   a processing device configured to generate a third media data; and
   an output device configured to output media data, the media data being the first media data, the second media data, or the third media data, the third media data affecting the first media data or the second media data if the third media data and the first media data are simultaneously outputted, or the third media data and the second media data are simultaneously outputted,
   wherein the processing device is further configured to obtain and process the first media data and the second media data to obtain a processing result, the processing result being used to generate presentation data indicating correspondences between the interfaces and the media data.

2. The device of claim 1, wherein the processing device obtaining and processing the first media data and the second media data to obtain the processing result includes:
   the processing device processing the first media data obtained through the first interface to obtain corresponding first identification data, and processing the second media data obtained through the second interface to obtain corresponding second identification data; and
   the processing device combining the first identification data and the second identification data with a preset user interface to generate the presentation data, the presentation data belonging to the third media data.

3. The device of claim 1, wherein the processing device obtaining and processing the first media data and the second media data to obtain the processing result includes:

the processing device processing the first media data obtained through the first interface to obtain the corresponding first identification data, and processing the second media data obtained through the second interface to obtain the corresponding second identification data; and the processing device sending the first identification data and the second identification data to a source device for the first source device or the second source device to generate the presentation data.

4. The device of claim 3, the electronic device further comprising:

a third interface configured to transmit data with the first source device; and a fourth interface configured to transmit data with the second source device, wherein:

the processing device is configured to respond to a first acquisition instruction from the first source device or the second source device;

the first identification data and the second identification data are sent to the first source device through the first interface or the third interface; or, the first identification data and the second identification data are sent to the second source device through the second interface or the fourth interface.

5. The device of claim 1 further comprising:

a timer configured to determine whether a preset period of time is reached, and reset and restart the timer when the preset period of time is reached; and a storage device configured to store the first identification data and the second identification data, wherein:

the processing device is further configured to process the first media data obtained through the first interface, and at the same time, process the second media data obtained through the second interface when the timer determines that the preset period of time is reached.

6. The device of claim 5, wherein:

the timer is configured to determine that the preset period of time is reached if the output device outputs the first media data; and the processing device is configured to process the first media data to obtain the first identification data, and at the same time, obtain the second media data from the second interface, and process the second media data to obtain the second identification data.

7. The device of claim 5, wherein the processing device is further configured to:

determine that a time difference between a time when the first media data and the second media data are obtained and a current time is less than the preset period of time, and use the stored first identification data and second identification data to generate the presentation data in response to obtaining a second acquisition instruction.

8. A processing method comprising:

obtaining, by a processing device, a first media data, the first media data being data obtained from a first interface connected to a first source device;

obtaining, by the processing device, a second media data, the second media data being data obtained from a second interface connected to a second source device;

processing, by the processing device, the first media data and the second media data to obtain a processing result, the processing result being used to generate presentation data indicating a correspondence between the interface and the media data, wherein:

the processing device is configured to generate a third media data, the third media data affecting the first media data or the second media data if the third media data and the first media data are simultaneously outputted, or the third media data and the second media data are simultaneously outputted.

9. The method of claim 8 further comprising:

outputting, by an output device, media data, the media data being the first media data, the second media data, or the third media data.

10. The method of claim 8, wherein the processing device processing the first media data and the second media data to obtain the processing result includes:

processing, by the processing device, the first media data obtained through the first interface to obtain corresponding first identification data, and the second media data obtained through the second interface to obtain corresponding second identification data;

combining, by the processing device, the first identification data and the second identification data with a preset user interface to generate the presentation data, the presentation data belonging to the third media data; or, sending, by the processing device, the first identification data and the second identification data to a source device for the first source device or the second source device to generate the presentation data.

11. The method of claim 8 further comprising:

transmitting, by a third interface, data with the first source device;

transmitting, by a fourth interface, data with the second source device; and responding, by the processing device, to a first acquisition instruction from the first source device or the second source device.

12. The method of claim 11, wherein:

the first identification data and the second identification data are sent to the first source device through the first interface or the third interface; or, the first identification data and the second identification data are sent to the second source device through the second interface or the fourth interface.

13. The method of claim 8, wherein the processing device is further configured to:

process the first media data obtained through the first interface, and at the same time, process the second media data obtained through the second interface in response to a timer determining that a preset period of time is reached;

store the first identification data and the second identification data;

reset and restart the timer when the preset period of time is reached;

process the first media data to obtain the first identification data, and at the same time, process the second media data from the second interface and process the second media data to obtain the second identification data if the output device outputs the first media data; or determine that a time difference between a time when the first media data and the second media data are obtained and a current time is less than the preset period of time, and use the stored first identification data and second identification data to generate the presentation data in response to obtaining a second acquisition instruction.

14. A processing system comprising:

a processor; and a memory storing program instructions that, when being executed by the processor, cause the processor to:

obtain a first media data of a connected first source device through a first interface;

obtain a second media data of a connected second source device through a second interface;

generate a third media data; and output media data, the media data being the first media data, the second media data, or the third media data, the third media data affecting the first media data or the second media data if the third media data and the first media data are simultaneously outputted, or the third media data and the second media data are simultaneously outputted.

15. The system of claim 14, wherein the processor is further configured to:

obtain and process the first media data and the second media data to obtain a processing result, the processing result being used to generate presentation data indicating correspondences between the interfaces and the media data.

16. The system of claim 14, wherein the processor is further configured to:

process the first media data obtained through the first interface to obtain corresponding first identification data, and process the second media data obtained through the second interface to obtain corresponding second identification data; and combine the first identification data and the second identification data with a preset user interface to generate the presentation data, the presentation data belonging to the third media data.

17. The system of claim 14, wherein the processor is further configured to:

process the first media data obtained through the first interface to obtain the corresponding first identification data, and process the second media data obtained through the second interface to obtain the corresponding second identification data; and send the first identification data and the second identification data to a source device for the first source device or the second source device to generate the presentation data.

18. The system of claim 14, wherein the processor is further configured to:

transmit data with the first source device through a third interface;

transmit data with the second source device through a fourth interface; and respond to a first acquisition instruction from the first source device or the second source device, the first identification data and the second identification data being sent to the first source device through the first interface or the third interface; or, the first identification data and the second identification data being sent to the second source device through the second interface or the fourth interface.

19. The system of claim 14, wherein the processor is further configured to:

determine whether a preset period of time is reached through a timer, and reset and restart the timer when the preset period of time is reached;

store the first identification data and the second identification data; and process the first media data obtained through the first interface, and at the same time, process the second media data obtained through the second interface when the timer determines that the preset period of time is reached.

20. The system of claim 19, wherein the processor is further configured to:

determine that a time difference between a time when the first media data and the second media data are obtained and a current time is less than the preset period of time, and use the stored first identification data and second identification data to generate the presentation data in response to obtaining a second acquisition instruction.

* * * * *